US012765473B2

(12) United States Patent
Van Der Sande et al.

(10) Patent No.: US 12,765,473 B2
(45) Date of Patent: Oct. 20, 2026

(54) METHOD OF GROWING A CROP AND HARVESTING DEVICE FOR USE IN THE METHOD

(71) Applicant: BELUA BEHEER B.V., Poeldijk (NL)

(72) Inventors: Johannes Adrianus Hendricus Maria Van Der Sande, Poeldijk (NL); Dirk Vermeulen, Poeldijk (NL); Jeroen Wim Van Lent, Poeldijk (NL)

(73) Assignee: BELUA BEHEER B.V., Poeldijk (NL)

( * ) Notice: Subject to any disclaimer, the term of this patent is extended or adjusted under 35 U.S.C. 154(b) by 0 days.

(21) Appl. No.: 18/857,481

(22) PCT Filed: May 11, 2023

(86) PCT No.: PCT/NL2023/050259

§ 371 (c)(1),
(2) Date: Oct. 17, 2024

(87) PCT Pub. No.: WO2023/219503

PCT Pub. Date: Nov. 16, 2023

(65) Prior Publication Data

US 2025/0268153 A1 Aug. 28, 2025

(30) Foreign Application Priority Data

May 12, 2022 (NL) ..................................... 2031842

(51) Int. Cl.

*A01G 9/029* (2018.01)
*A01D 46/00* (2006.01)
*A01G 22/05* (2018.01)

(52) U.S. Cl.

CPC ........... *A01G 9/0299* (2018.02); *A01D 46/00* (2013.01); *A01G 22/05* (2018.02)

(58) Field of Classification Search

CPC .. A01G 9/0299; A01G 9/0297; A01G 9/0293; A01G 9/029; A01G 9/047; A01G 31/00; A01G 31/023; A01G 7/045

See application file for complete search history.

(56) References Cited

U.S. PATENT DOCUMENTS 3,824,736 A * 7/1974 Davis ..................... A01G 7/045 47/17
4,379,375 A * 4/1983 Eisenberg .............. A01G 31/02 47/65

(Continued)

FOREIGN PATENT DOCUMENTS

DE 3602035 A1 * 8/1986
JP 2015019634 A 2/2015

(Continued)

*Primary Examiner* — Kristen C Hayes
(74) *Attorney, Agent, or Firm* — Ipsilon USA—NLO

(57) ABSTRACT

A method of growing a crop includes growing a seedling (1) in a first growing substrate plug/pellet (2,4), and placing the substrate plug/pellet (2,4) in a holder member (10,20), the holder member having a tubular body (11,23) and a flange (12,24) extending transversely to the tubular body, the body having a bottom (13, 22) with a root opening. A number of holder members are placed in growth trays (25; 35,36,37) The growth trays (25; 35,36,37) are placed in a conditioned growth chamber (40) and the plants are exposed to artificial light. After a predetermined period of time, the growth trays are removed to a harvesting area (50), and the crop is removed from the holder members (10,20) and transported through a harvesting device (52, 70) for separating fruit from leaves, and collecting the fruit.

13 Claims, 10 Drawing Sheets

(56) References Cited

U.S. PATENT DOCUMENTS

| | | | | |
|---|---|---|---|---|
| 9,775,301 | B2 * | 10/2017 | Nagadome | A01G 7/045 |
| 10,477,786 | B1 * | 11/2019 | Wilson | A01G 9/042 |
| 2015/0000191 | A1 * | 1/2015 | Nagadome | A01G 9/00<br>47/66.6 |
| 2021/0105960 | A1 * | 4/2021 | Yukawa | A01G 18/62 |
| 2023/0363326 | A1 * | 11/2023 | Hennayaka | A01G 31/04 |
| 2024/0245011 | A1 * | 7/2024 | Burnette | A01G 7/00 |

FOREIGN PATENT DOCUMENTS

| | | | | |
|---|---|---|---|---|
| NL | 8801724 | A * | 2/1990 | A01G 9/0295 |
| WO | 9712509 | A1 | 4/1997 | |

* cited by examiner

METHOD OF GROWING A CROP AND HARVESTING DEVICE FOR USE IN THE METHOD

FIELD OF THE INVENTION

The invention relates to a method of growing a crop in a conditioned environment, such as a greenhouse or warehouse. The invention also relates to an assembly of a growth tray and holder members, a holder member and to a harvesting device.

BACKGROUND OF THE INVENTION

It is known to grow lettuce in conditioned growth chambers, wherein seedlings are grown that, after they have reached a certain size, are placed in growth trays. The trays may be arranged side by side or may be stacked in a vertical direction and are provided with an irrigation mechanism for feeding liquid and nutrients to the roots of the lettuce. Root heating or cooling may be provided for controlling the growth. The lettuce is lighted by overhead LED lights that provide the spectrum that is best suitable to the stage of the growth. When the lettuce has reached the required size, the growth trays are removed from the growth chamber and the lettuce is harvested by removal of the crops from the growth trays.

Fruit-bearing crop, such as tomatoes, are grown with the roots placed in gutters through which liquid and dissolved nutrients are flown. The stems of the tomato plants are suspended from an overhead support via high wires. As the stems grow, they need to be repositioned on the wires by hand, and the lower leaves are manually removed from the stems. The first harvesting of the plants occurs after 2-3 months, and the plants are replaced by new plants once a year. The harvesting is carried out by hand. This process of pinching, turning, dropping, removal of the leaves and manual harvesting makes the known growing method relatively labour intensive. After harvesting, the gutters need to be cleaned and refilled with new crop, which results in a relatively long period of downtime in production. The frequent entering and leaving of operating personnel into the greenhouse may results in transfer of contamination, pests and plant disease to the growing area.

It is an object of the invention to provide a method of efficiently growing and harvesting fruit-bearing crop. The growing and harvesting method according to the invention should be suitable for different crop such as small-sized snack tomatoes, cucumbers, paprika's and similar fruit. The method of the invention is intended to provide for a well-defined growth process with reduced disease and should allow multiple cycles of harvesting in a year. The harvesting method and device should allow switching between crop in the growth chamber, such as from bonsai tomatoes to paprika's, to react to market demands. It is furthermore intended to provide a growing and harvesting method and a harvesting device allowing a high degree of automatization and reducing manual labour.

It is furthermore an object to provide a method of efficiently harvesting a fruit-bearing crop at a high rate, while avoiding damage to the fruit.

SUMMARY OF THE INVENTION

Hereto the method according to the invention comprises:
growing a seedling in a first growing substrate plug/pellet,
placing the substrate plug/pellet in a holder member, the holder member comprising a tubular body and a flange extending transversely to the tubular body, the body having a bottom with a root opening,
placing a number of holder members in a growth tray, the growth tray having a bottom and upstanding sidewalls, defining an irrigation space that is adapted for receiving water and nutrients, and a top surface spaced from the bottom, with openings for receiving a holder member, the flange being supported on the top surface, the bottom part of the pellet being in fluid communication with the irrigation space,
placing the growth trays in a conditioned growth chamber and exposing the plants to artificial light, after a predetermined period of time, removing the growth trays to a harvesting area and separating the fruit from the stems and the leaves in the harvesting area, and
collecting the fruit.

The seedlings in the substrate plug are placed in the holder member, which can subsequently be handled by hand or automatically via the flange, without the need for touching the crop. The holder members are positioned in the openings in the top surface of the growth tray. With the term "growth tray" as used herein, a rectangular tray or elongate gutter is intended in which the holder members are positioned, either side by side or in a row.

The tubular body of the holder member contains the roots of the crop and is open at its bottom. The tubular body extends downwards into the irrigation space of the growth tray, in which water and nutrients are flowing in a thin layer or film over the bottom, along the roots of the crop. The openings in the top surface of the growth tray are covered by the flange of each respective holder member, so that light is prevented from coming into contact with the nutrients flowing in the growth trays.

The growth trays are placed in a conditioned growth chamber where they are exposed to artificial lighting. After a predetermined time period, such as several weeks, when the crop has reached a predetermined size, the growth trays are removed from the growth chamber and transported to a harvesting area. The crop has been bred or genetically modified in such a way that substantially all fruit are ready for harvesting at the same moment in time. In the harvesting area, the fruit is separated from the stems and the leaves and is collected.

The harvesting can be carried out manually. Preferably the crop is removed from the holder members and transported through a harvesting device for separating fruit from the stems and leaves and collecting the fruit.

The holder members can be removed from the growth trays and the crop are removed from the holder members and fed into a harvesting device in which the leaves are separated from the fruit. The fruit is collected and transported to a location of packaging, storage, or sale.

The method according to the invention is highly automated and reduces the need for human interaction by about 70%-80%, hence reducing labour costs. The crop is grown in batches under constant growing conditions, resulting in little stress for the plants, a constant rate of photosynthesis and a constant and predictable rate of growth which results in an annual increase in yield of 38% or more. The plants ripen in batches and can grow from seeds to harvest within 15 weeks, with a strongly reduced need for the use of pesticides due to the reduced risk of infection. Efficient use of space is possible by the dense packing of the plants since no space for human access needs to be provided around the crop.

The method according to the invention is particularly suitable for small-sized tomatoes (so-called “Bonsai tomatoes”) which have been genetically bred such that the fruit grows on top of a relatively short stem, to not have a second flowering and to terminate the fruit growing process at a pre-defined moment, so that all tomatoes in a batch are ready for harvesting at the same time. The crop can be densely packed on the growth trays, such as 16-25 crop per $m^2$.

The method according to the invention is energy effective, as the absence of a second flowering in the crop utilises over less than 40% of energy that needs not be spent on lighting as is the case for usual growth of tomatoes.

The method according to the invention is also suitable for other types of tomatoes, cucumbers, paprika’s and similar fruit. The method of the invention provides for a well-defined growth pattern, with reduced disease, and allows five or more cycles of harvesting in a year. It is also possible by the method of the invention to switch between crop in the growth chamber, such as from bonsai tomatoes to paprika’s, to react to market demands.

The growth trays may be elongate, in the form of a gutter, and can comprise a row of at least three holder members.

In the elongate growth trays, light can be effectively shielded and prevented from entering into trays to irradiate the liquid, which can lead to the formation of algae.

The elongate growth trays may have a length of 0.5 m-10 m, a width of 10-40 cm and a height of 5-30 cm and can be placed at a height of about 1-2 m from the floor, with their longitudinal sides touching or placed at a small mutual horizontal spacing. The trays may be stacked vertically in a multi-layer system, each layer being provided with its own overhead lighting system.

The harvesting device may have an axis with a number of radial, relatively flexible fingers, which are pivotable about the axis and a number of guide bars having a separating section extending along a circumferential path in the proximity of an end part of the fingers. A drive member is provided for oscillating the shaft around its axis.

The oscillating fingers of the harvesting device may in an embodiment be driven by a continuously rotating drive gear and a lug reciprocating in the slit of a flange. This provides a light-weight drive mechanism with little mechanical losses and results in low loads on the bearings of the shaft.

An infeed adjustment member may be provided for adjusting the height of an infeed position of the guide members to adjust for variations in size of the crop that is harvested.

An adjustment member may be provided for changing the vertical and sideways position of the shaft relative to the guide bars.

The fingers may be connected to the shaft via a base member carrying two or more fingers. The size of the base member determines the radial extent of the fingers and the flexibility of the interaction of the finger ends with the crop that is harvested.

BRIEF DESCRIPTION OF THE DRAWINGS

An embodiment of a harvesting method and a harvesting device according to the invention will, by way of non-limiting example, be described in detail with reference to the accompanying drawing. In the drawing.

DETAILED DESCRIPTION

Figure 1A:
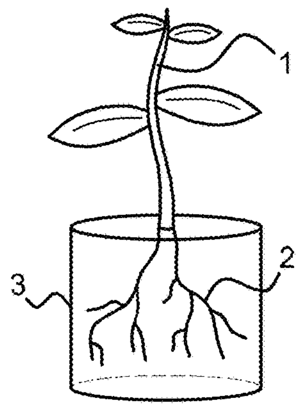
FIG. 1 schematically shows six stages of the growing and harvesting method according to the invention.
Figure 1B:
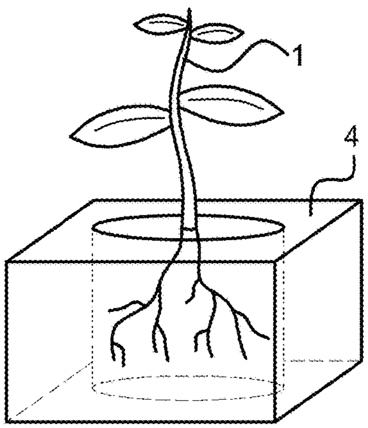
Figure 1C:
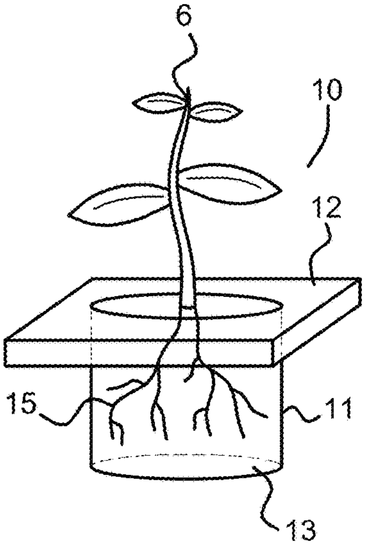

FIG. 1 shows a first stage I of the growing method, in which a seedling 1 is grown with its roots 2 in a growing substrate 3. In growing stage II, the larger seedling 1 is placed in a growing substrate 4 of larger dimensions, until a small crop is grown. In stage III, the small crop 6 is placed with a growing substrate in a holder member 10, having a cylindrical body 11 and a flange 12. The bottom 13 of the cylindrical body is provided with openings, or is open across its entire surface, to allow access of water and nutrients to the roots 15 of the crop 6 that is placed in the cylindrical body 11. In stage IV, it is shown that the holder members 10, 20 containing the crops 6, 21 are placed in a growth tray or gutter 25.

In the sequence described above, relatively large amounts of substrate material 3 are used. In an alternative sequence, in order to save substrate material, the growing substrate 3 in stage I can be directly inserted into the holder member 10 of stage III, so that stage II is omitted.

Again, alternatively, instead of using a single holder member 10 in stage III, a number of interconnected holder members 10 can be used, each comprising a small crop. The interconnected holder members are placed onto a U-shaped growth tray or gutter 25 that is open at its top surface, the interconnected flanges 12 of the holder members forming a lid. The gutter 25 shown at stage IV comprises a bottom 26, upstanding sidewalls 27, 28 and a top surface 29 with openings 30, 31 for receiving the holder members 10, 20. When a holder member 10, 20 is placed in an opening 30, 31, the flanges 12, 24 are supported on the top surface 29 and the lower part 22 of the cylindrical body 23 is situated close to the bottom 26 so that the roots of the crop 21 can reach the water and nutrients flowing over the bottom 26. The flow of water and nutrients over the bottom 26 has been schematically indicated by the arrow L.

The flanges 12, 24 are of such dimensions that the openings 30, 31 are completely covered and access of light into the gutter 25 is blocked.

In stage V it is shown that a number of gutters 35,36, 37 are placed in a growth chamber 40, each on a respective support 41. An air conditioning unit 43 provides air with the required temperature and humidity into the growth chamber 40. Air tubes 42 may be provided extending along the length of the gutters 35-37 for providing an upward stream of air along the crops. Overhead lighting 44 provides the required amount for photosynthetically active (PAR) radiation to the crop, no daylight being admitted inside the growth chamber 40. A water and nutrient supply (not shown in the figure) supply a layer of water across the bottom of each gutter 35-37.

When the crop is full grown in stage V, they are moved from the growth chamber 40 to a harvesting area 50 either together with the gutters 35-37, that are shown in a stacked configuration, or by taking the individual holder members 10, 20 to the harvesting area 50. This is shown in stage VI. In the harvesting area 50, the grown crop is removed from the holder members and placed on a conveyor belt 51 to be transported to an oscillating harvesting device 52 for separating the leaves from the fruit. The fruit is collected in a container 53 and is transported to a site for storage and/or transport.

Figure 1D:
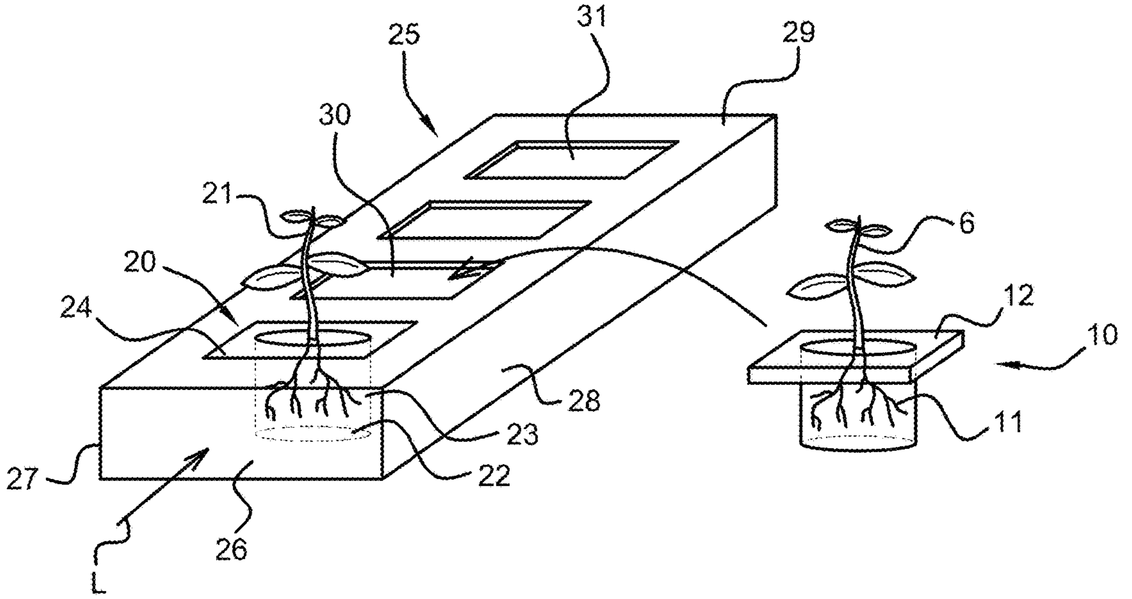
Figure 1E:
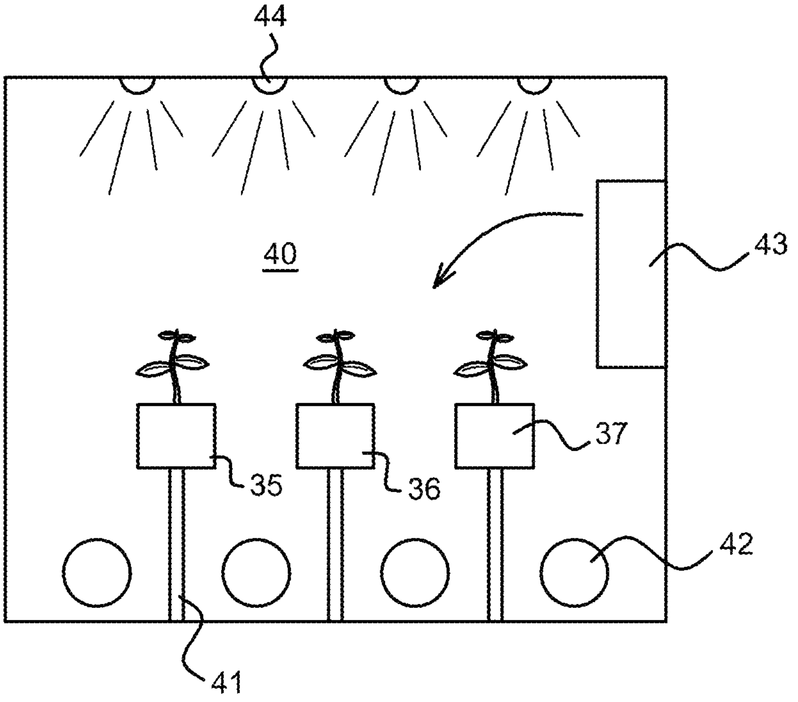
Figure 1F:
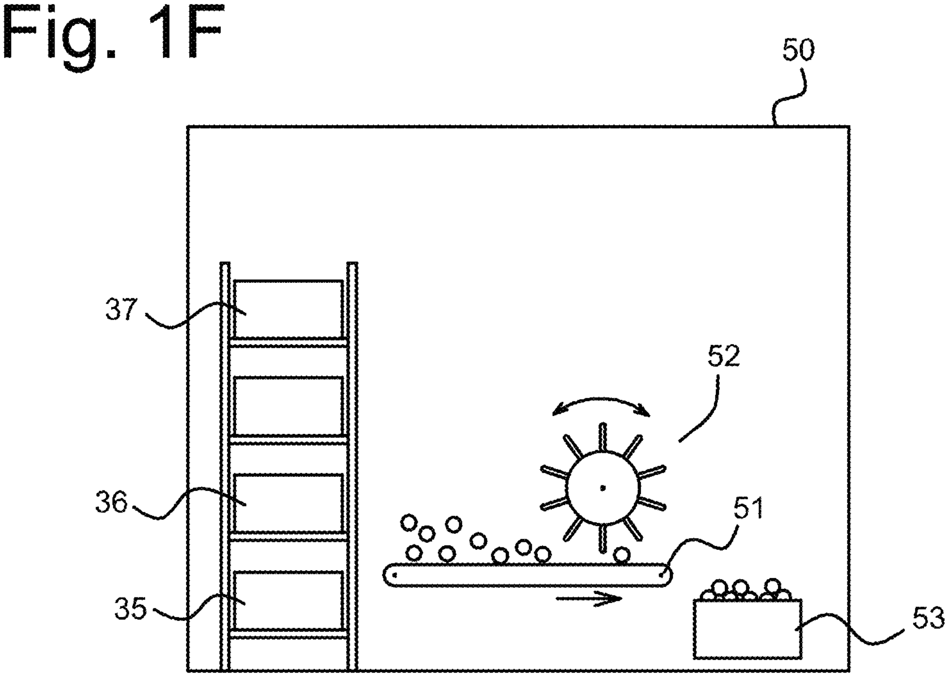
Figure 2:
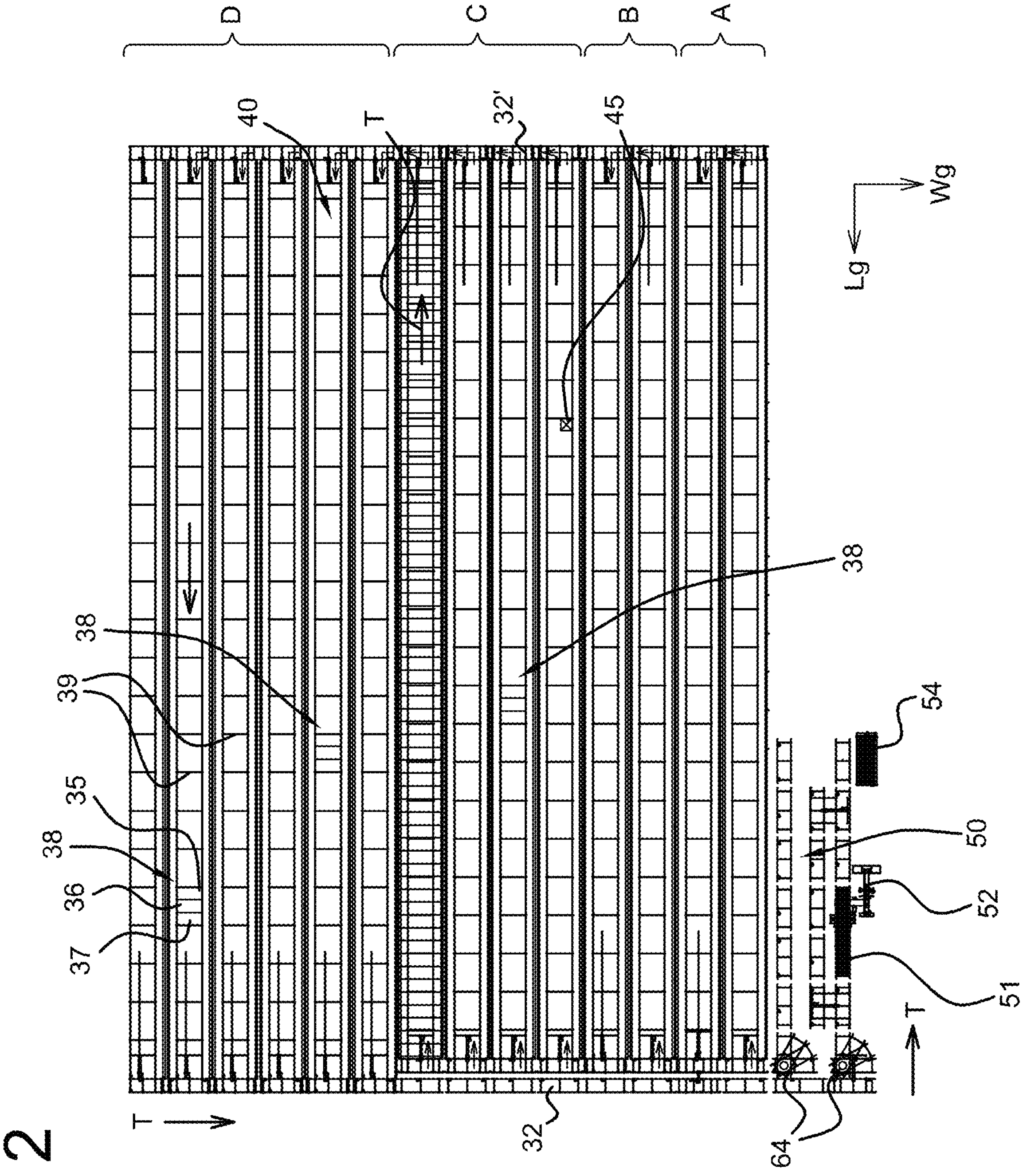
FIG. 2 shows a top view of a growth chamber and harvesting area according to the invention.

FIG. 2 shows a plan view of a growth chamber 40, having a dimension in the length direction $L_g$ of about 125 m and a dimension in the width direction $W_g$ of about 130 m. The growth chamber 40 and the harvesting area 50 that are shown in FIG. 2, accommodate the stages that are shown in FIGS. 1*d*, 1*e* and 1*f*.

In zone A of FIG. 2, the small plants are placed in the holder members 10 and gutters 25. In Zone B the plants are placed at a larger mutual distance to arrive at a lower plant density, which remains the same in zones B through D. In zone C, fertilisation of the plants takes place via an agitating member 45. In zone D the ripening process is completed, after which the plants are moved to the harvesting area 50.

Groups 38 of parallel gutters 35,36,37 are transported by transport members 39 in the transport direction T to side conveyors 32, 32' that extend in the width direction $W_g$ along each transverse side of the growth chamber 40. The side conveyors 32 transport the crop, via rotating turning stations 64, to the harvesting area 50, in which the part of the crop bearing the fruit is cut from the stem and is released from the gutters 35-37. The fruit is separated from the leaves and the cut stem of the crop in the harvesting device 52.

After removal of the top surfaces of the gutters, the roots and remaining parts of the stems of the harvested crop are removed from the gutters, following which the gutters are cleaned in a washing station 54 using high pressure water jets and/or steam.

In the growth chamber 40, an agitating member 45 is provided for rustling of the leaves of the crop for pollination purposes. The agitating member 45 may be a vibrating device that is connected to a part the support of the gutters 35-37, for transferring vibrations to the gutters that are transported overhead of the vibrating device. The support is provided with rubber connectors for isolating the vibrations of the agitating member from the surrounding parts of the support.

Alternatively, the agitating member 45 may comprise a fan or blower, impinging air on the leaves of the crop.

Figure 3:
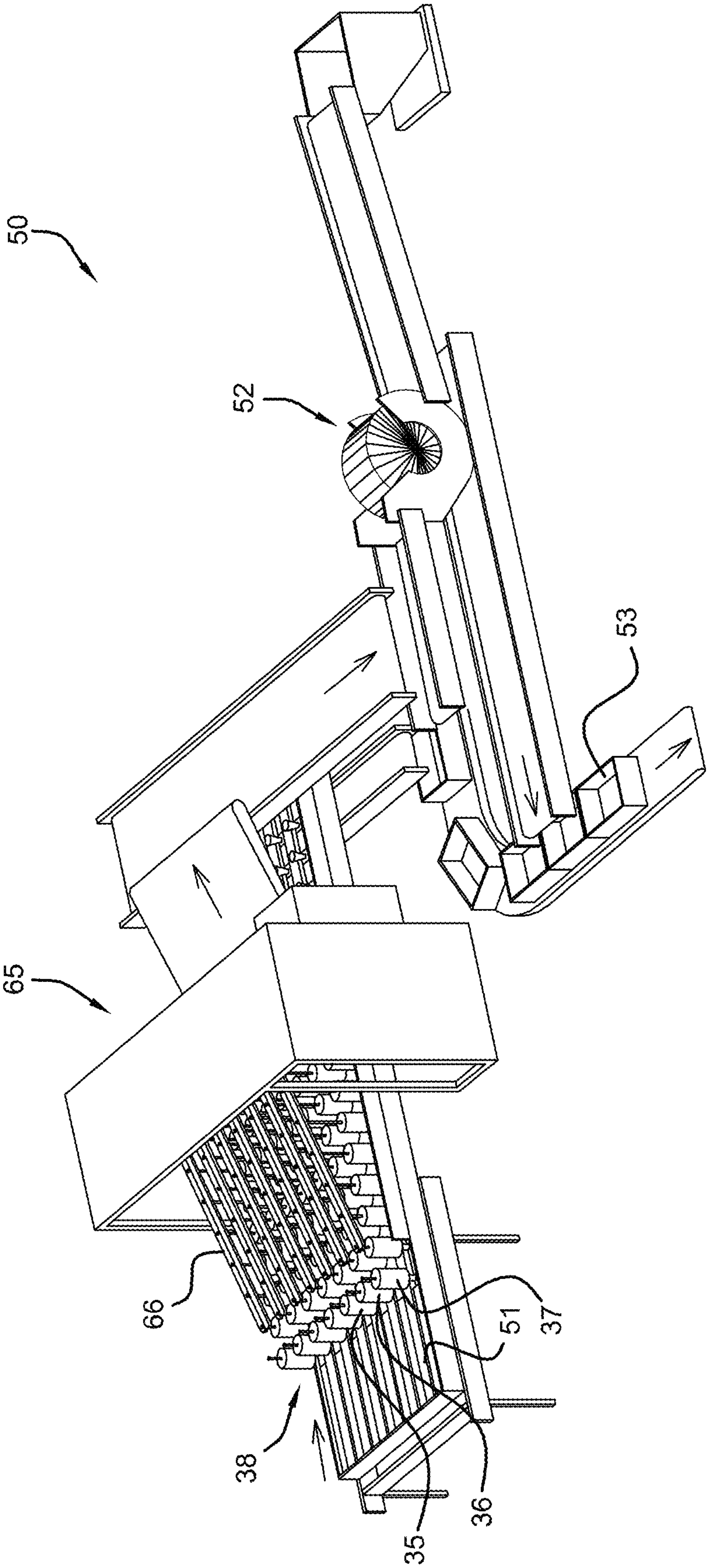
FIG. 3 shows a perspective view of a cutting station and a harvesting device according to the invention.

FIG. 3 shows that in the harvesting area 50, the gutters 35-37 are transported on a conveyor 51 to a cutting station 65. Prior to entering the cutting station 65, the guide elements that are vertically protruding from the gutters 35-37 for guiding of the crop, are removed by a removal device 66. The removal device 66 may comprise pairs of rotating belts that pinch the guide elements and transport these elements upwards, pulling the guide elements from the holes in which they are supported in the holder members 10. The cut-off stems carrying leaves and fruit are transported from the cutting station 65 to the harvesting device 52 in which the fruit is separated and collected in containers 53.

Figure 4:
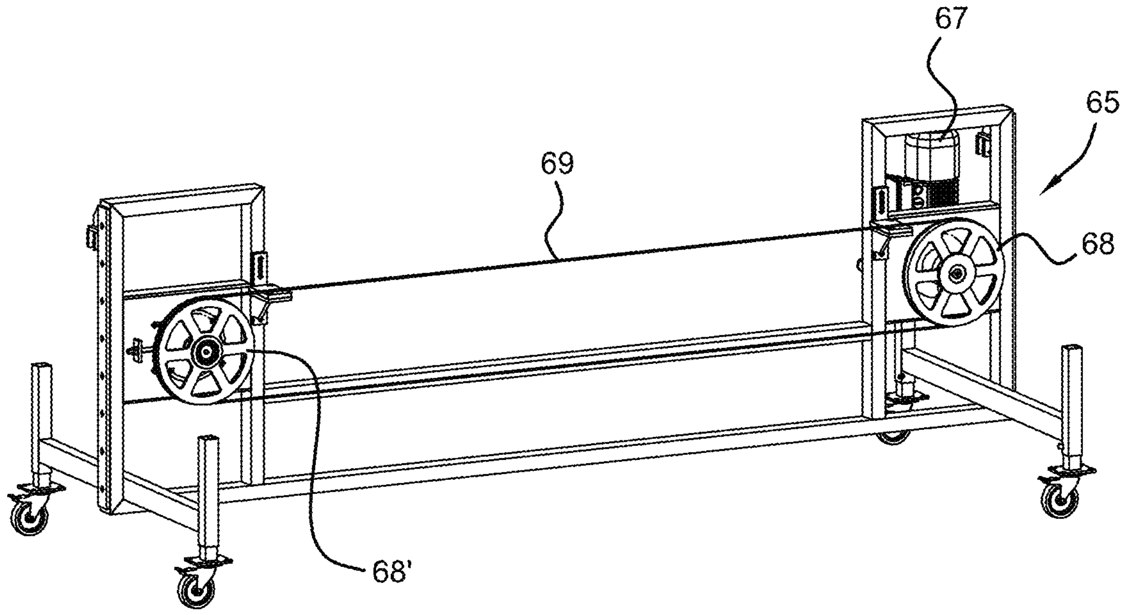
FIG. 4 shows a perspective view of a cutting device for use in the cutting station of FIG. 3, FIG. 5 and FIG. 6 show perspective views of a holder member according to the invention.

FIG. 4 shows the cutting station 65 comprising a bandsaw 69 driven by a motor 67 and two pulleys 68, 68'. The bandsaw 69 extends above the gutters 35-37, transversely to the conveyor 51.

Figure 5:
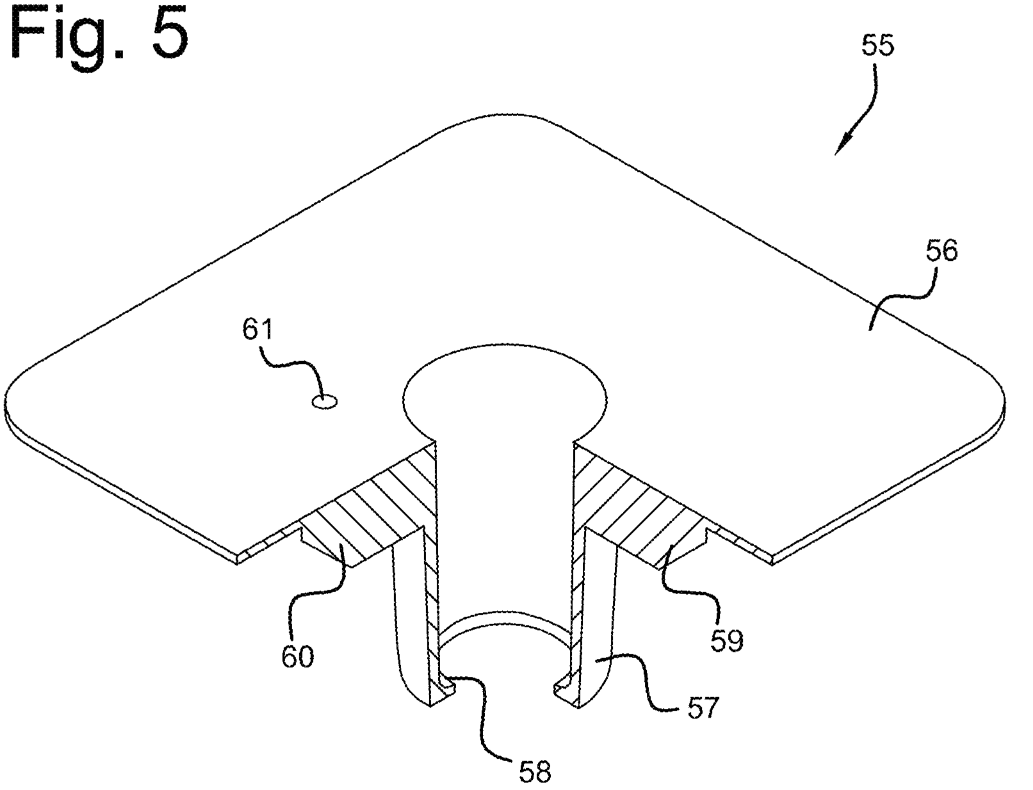

FIG. 5 shows a partly cut-away view of a holder member 55, with a flange 56 and cylindrical body 57 that is open at the bottom 58. Reinforcement ribs 59 are provided and an opening 61 is present in the flange 56 for receiving a vertical guide member for guiding of the crop.

Figure 6:
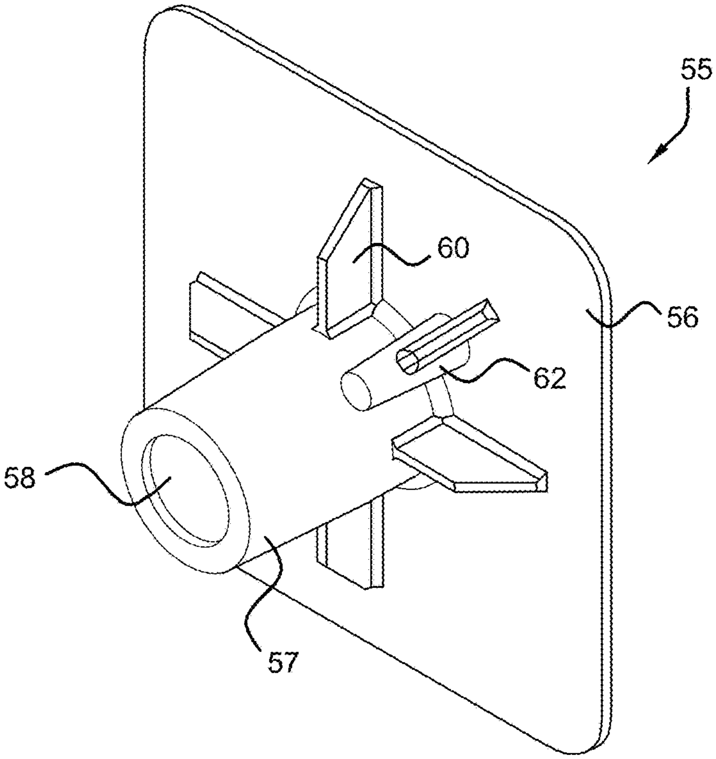

FIG. 6 shows the holder member 55, seen from the side of the cylindrical body 57 and shows a receiving member 62 on the bottom side of the flange 56, accessible via the opening 61 for receiving a guide member.

Figure 7:
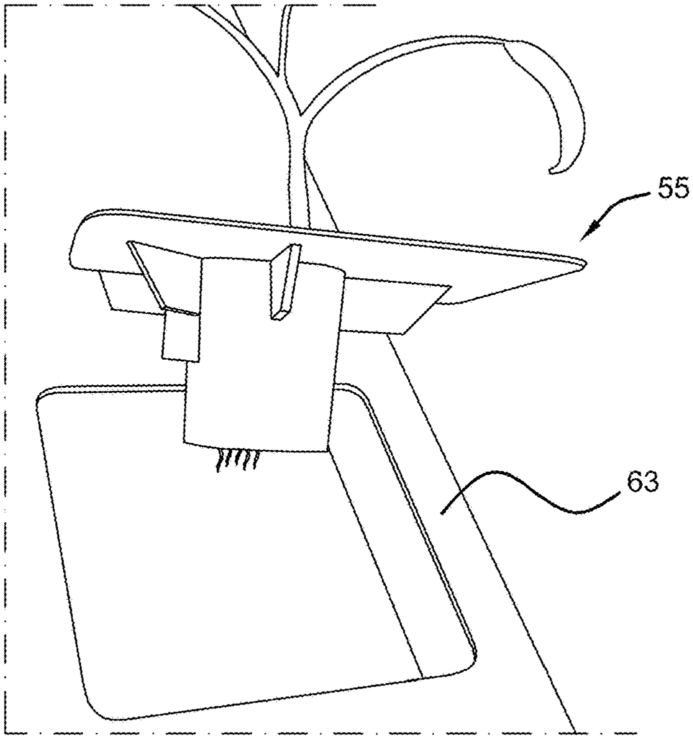
FIG. 7 shows the placement of a holder member in a growth gutter.

FIG. 7 shows manual placement of the holder member 55 in a gutter 63.

Figure 8:
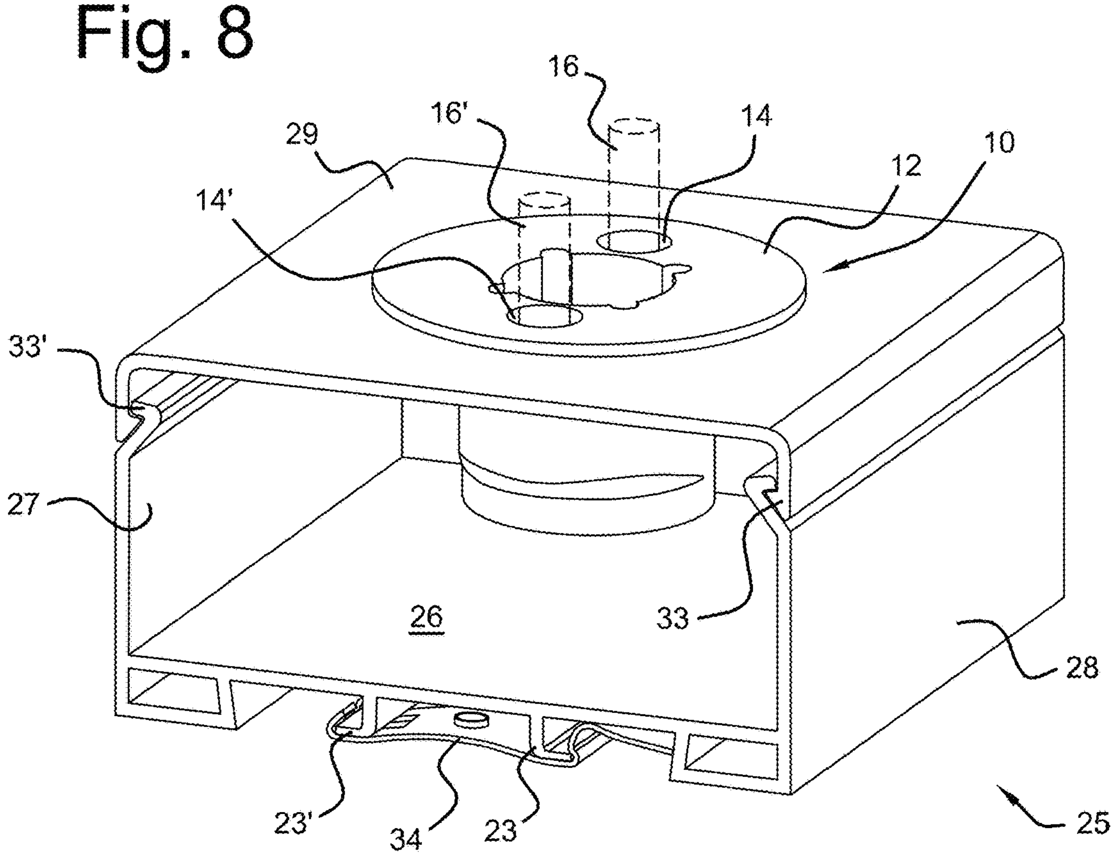
FIG. 8 and FIG. 9 show a perspective cross-sectional view of an embodiment of a growth gutter and a holding member according to the invention.

FIG. 8 shows an embodiment of a gutter 25 in which the top surface 29 is of a U-shaped cross-section and can be clipped onto the sidewalls 27,28 via a hook-shaped connector 33, 33'. The top surface 29 forms a lid that can be completely removed from the sidewalls 27,28, allowing easy access to the gutters for the removal of plant rests such as roots and for cleaning the gutters after harvesting of the fruit.

The holder member 10 comprises two holes 14, 14' in which guide members 16,16', such as straight sticks, are clamped. The holder member 10 is made of a flexible material that allows the guide members 16,16' to be placed at angle relative to the top surface 29. This provides sufficient play when the guide members 16 16' are pulled upward at an angle from holder member 10 by the removal device 66 that is shown in FIG. 3.

Figure 9:
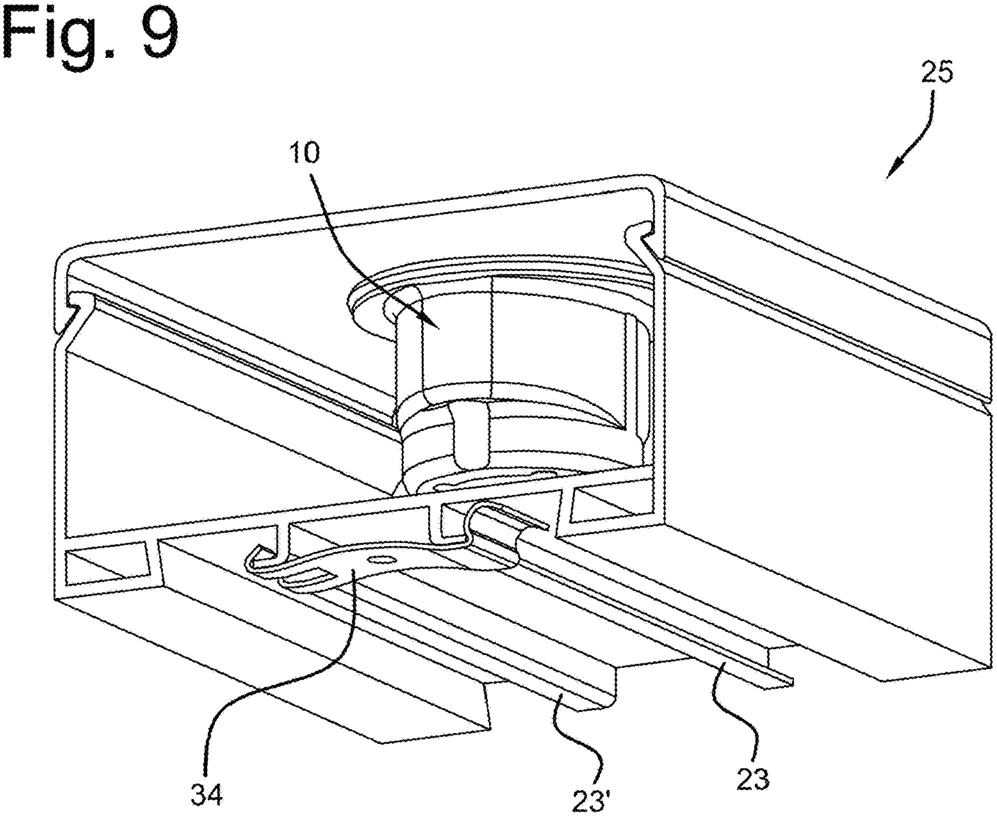

FIG. 9 shows a clip-on bracket 34 that is connected to two L-shaped ridges 23,23' at the outer bottom surface of the gutter 25. The bracket 34 can be fixed to a transport member 39, such as shown in FIG. 2, by means of a bolt or screw and can be quickly released from the gutter 25 by the flexible engagement of the bracket 34 with the ridges 23,23'. The gutters can in this way be easily unclipped from the transport member 39 for cleaning or exchange.

Figure 10:
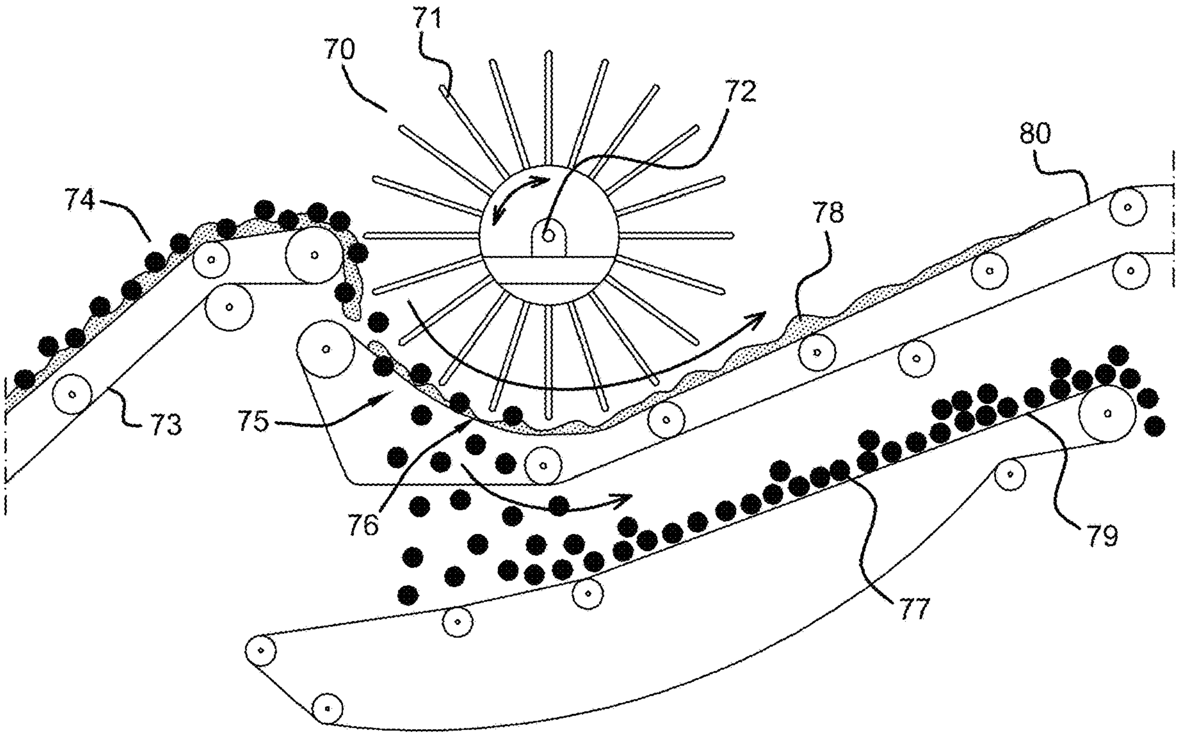
FIG. 10 and FIG. 11 show an axial view of a harvesting device according to the invention.

FIG. 10 shows a side view of a harvesting device 70 comprising an oscillating shaft 72 carrying a plurality of fingers 71, made of ABS or HDPE. The fingers 71 can also be made from steel, aluminium, nylon, or composite materials such as a carbon fibre composite. The crop 74, comprising fruit attached to leaves, is transported on a conveyor 73 to a contact position 75 along a circumferential path 76 extending along the tips of the fingers 71. The conveyor 73 may comprise a belt or a number of spaced-apart guide members. The guide members may be provided with a vibrating drive that shakes out debris and loose ripe fruit, which can then drop past the guide members to be collected prior to contacting the fingers 71. The attached fruit 77 is separated from the stem and the leaves 78 by the contact of the crop with the oscillating fingers 71 and the separated fruit is transported on conveyor belt 79. The leaves 78 and stems are transported on a conveyor belt 80.

Figure 11:
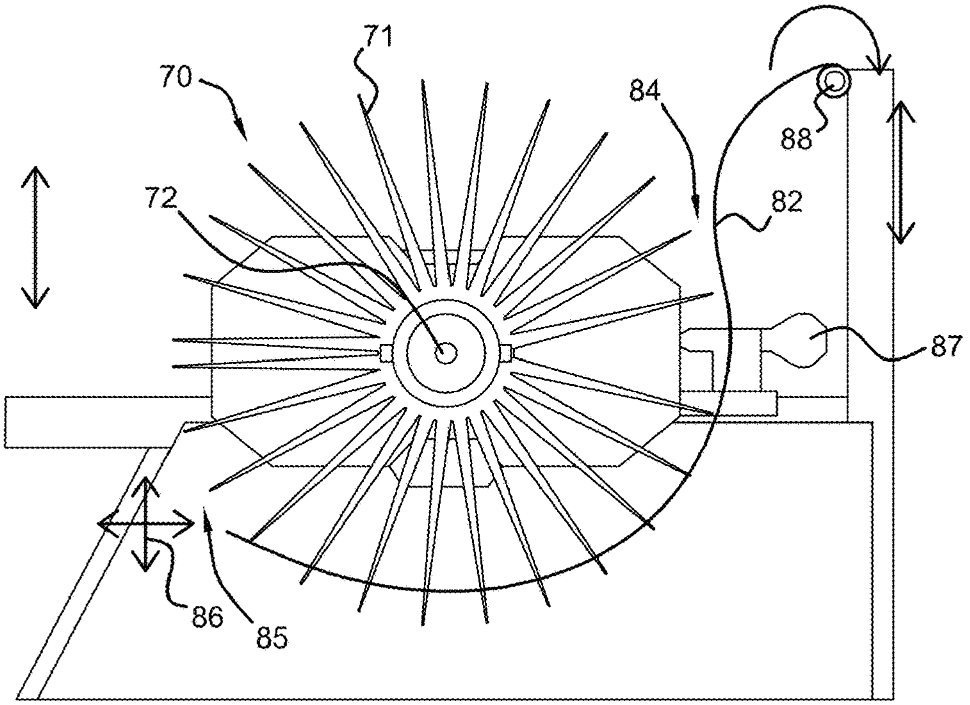

FIG. 11 shows a side view of a harvesting device 70, with a guide member 82, that may comprise a number of spaced-apart guide bars, extending from an entry position 84 where the fruit attached to the leaves enter, to an exit position 85 where the leaves that are separated from the fruit leave the device 70. The device 70 comprises an adjustment member 87 for changing position of the fingers 71 in the sideways and in the vertical direction, as indicated by the arrows 86. An adjustment of the guide member 82 may be achieved through adjustment member 88.

Adjustments are made to the position of the infeed of the crop and to the relative position of the guide member 82 along the circumferential path with respect to the end part of the fingers 71, to obtain good contact of the fruit with the oscillating fingers along the lower perimeter of the fingers and to provide efficient separation of the fruit from the leaves and stems, while avoiding damage to the fruit.

Figure 12:
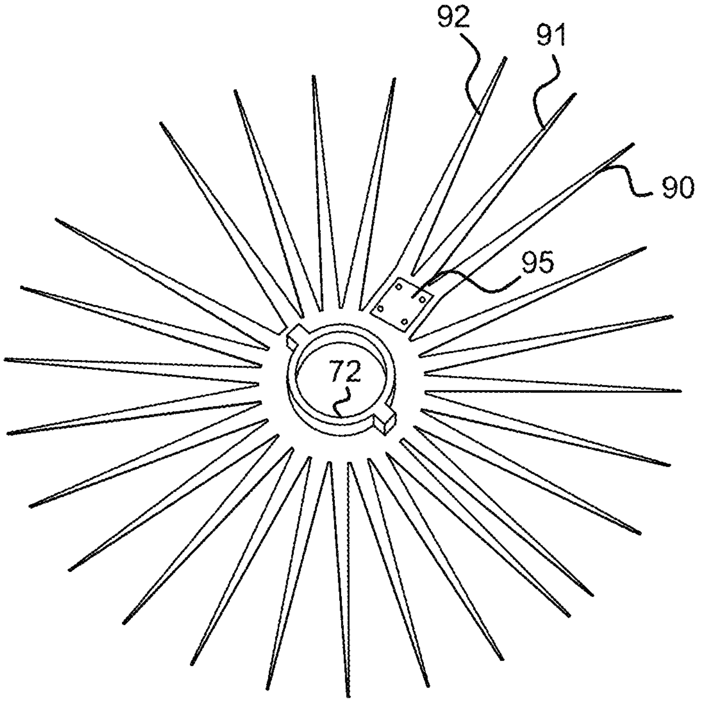
FIG. 12 shows a harvesting device having multiple fingers connected to a base member.

FIG. 12 shows a base member 95, attached to the shaft 72 and carrying three fingers 90, 91, 92 for easy replacement.

Figure 13:
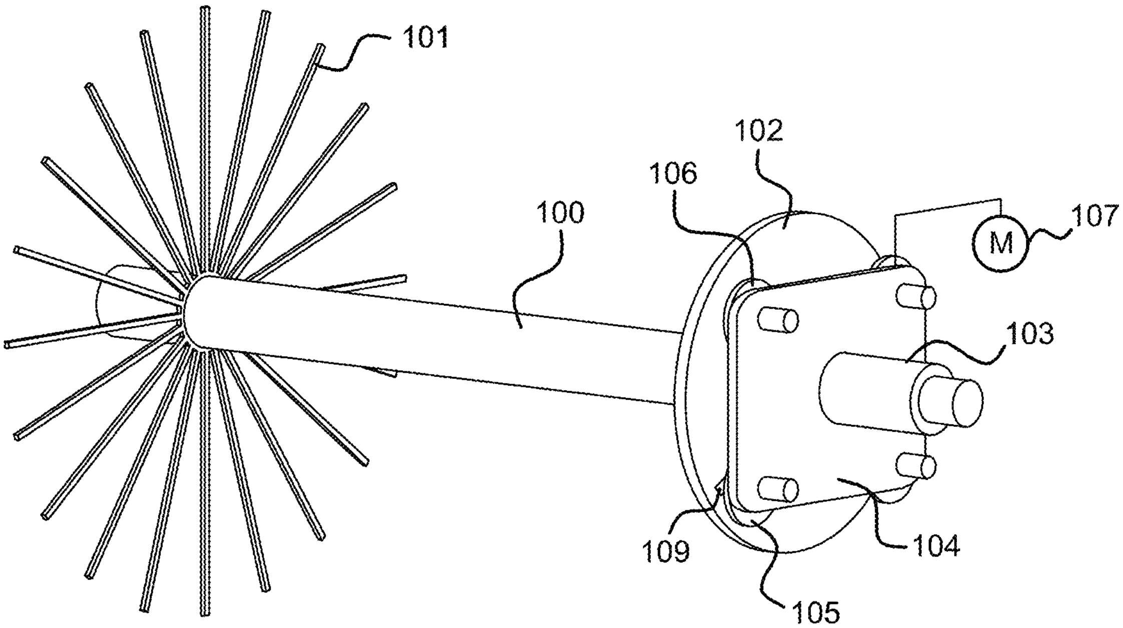
FIG. 13 shows a perspective view of a drive mechanism of a harvesting device according to the invention.
Figure 14:
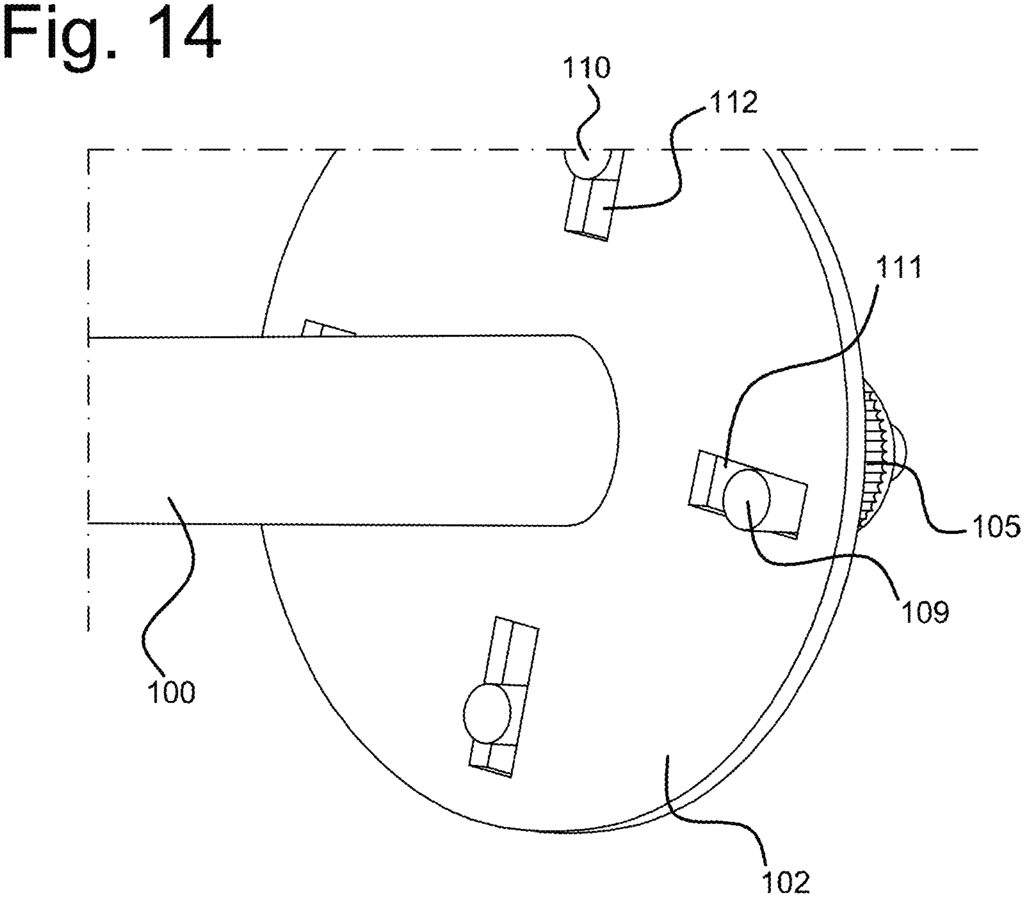
FIG. 14 shows an enlarged detail of the flange and slits of the harvesting device of FIG. 13.

FIGS. 13 and 14 show the shaft 100 carrying at one end the fingers 101 and having at a drive end a flange 102. On a carrier plate 104, gears 105, 106 are mounted. The gears 105, 106 are driven in rotation around their axes that extend parallel to the shaft 100, by a motor unit 107. Each gear 105, 106 is provided with a transverse lug 109, 110, extending in a slit 111, 112 in the direction of the shaft 100. By rotation of the gears 105, 106, the lugs 109, 110 move back and forth in the slits 111, 112 and the shaft 100 is oscillated around its longitudinal axis.

In a preferred embodiment, the shaft 100 is oscillated by a servomotor that is driven in an oscillating manner, in which the frequency of oscillation and the period between oscillations is adjusted in dependence of the type of fruit and the growing stage or the degree of ripening of the fruit.

The invention claimed is:

1. Method of growing a fruit-bearing crop comprising the steps of:

growing a seedling in a first growing substrate plug/pellet, placing the substrate plug/pellet in a holder member, the holder member comprising a tubular body and a flange extending transversely to the tubular body, the body having a bottom with a root opening, placing a number of holder members, each carrying a crop, in a growth tray, the growth tray having a bottom and upstanding sidewalls, defining an irrigation space that is adapted for receiving water and nutrients, and a top surface spaced from the bottom, with openings for receiving a holder member, the flange being supported on near the top surface, a bottom of the holder members being in fluid communication with the irrigation space, placing growth trays in a conditioned growth chamber and exposing the plants to artificial light and arranging the growth trays along a number of parallel rows extending in a length direction Lg of the growth chamber, after a predetermined period of time, removing of the growth trays to a harvesting area, by contacting the trays with transport members and moving the trays by the transport members along their respective rows to a side conveyor extending in a width direction Wg of the growth chamber, the crop having, at a moment of moving to the harvesting area, a height that is no larger than 1 m, the crop being transported with the growth trays to the harvesting area in an upright position.

2. Method according to claim 1, comprising the step of removing the crop from the holder members and transporting the crop through a harvesting device in the harvesting area for separating fruit from stems and leaves.

3. Method according to claim 1, comprising excluding the entrance of sunlight from the growth chamber.

4. Method according to claim 1, the flange covering the area of the opening in the top surface.

5. Method according to claim 1, the growth tray being elongate, comprising a row of at least 3 holder members.

6. Method according to claim 1, comprising placing the growth trays at a height of about 1-2 m from a floor.

7. The method according to claim 1, and further comprising separating the fruit from stems and the leaves in the harvesting area and collecting the fruit.

8. The method of claim 1, using an assembly of a growth tray and a number of holder members the growth tray being of elongate shape, with the openings arranged along the length of the growth tray wherein the top surface forms a lid that can be completely removed from the sidewalls.

9. The method of claim 1, wherein the holder member comprises a guide member extending from the tubular body in an axial direction.

10. The method of claim 1, comprising operating a harvesting device in the harvesting area for separating fruits from crop, comprising a shaft with at a contact end a number of radial fingers that are pivotable about an axis of the shaft and a number of guide members extending along a circumferential path in the proximity of an end part of the fingers, from a contact position to an exit position, and a drive member for oscillating the shaft around its axis, the shaft at a drive end being provided with a servomotor with a variable frequency of oscillation and variable intervals between oscillations.

11. The method according to claim 10, the harvesting device comprising an infeed adjustment member for adjusting the height of an infeed position of the guide members.

12. The method according to claim 10, the harvesting device, comprising an adjustment member for changing the vertical and sideways position of the shaft relative to the guide members.

13. The method according to claim 10, the harvesting device comprising a base member carrying two or more fingers, the base member being connected to the shaft.

* * * * *